US012076750B2

(12) United States Patent
Verouden et al.

(10) Patent No.: US 12,076,750 B2
(45) Date of Patent: Sep. 3, 2024

(54) APPARATUS AND METHOD FOR SCREENING POWDERS

(71) Applicant: Space-XYZ IP B.V., Terborg (NL)

(72) Inventors: Franciscus Quirinus Fredrik Verouden, Terborg (NL); Mathijs Cornelis Theodorus Reuling, Terborg (NL)

(73) Assignee: SPACE-XYZ IP B.V., Terborg (NL)

( * ) Notice: Subject to any disclaimer, the term of this patent is extended or adjusted under 35 U.S.C. 154(b) by 0 days.

(21) Appl. No.: 17/242,699

(22) Filed: Apr. 28, 2021

(65) Prior Publication Data

US 2021/0331209 A1 Oct. 28, 2021

(30) Foreign Application Priority Data

Apr. 28, 2020 (NL) ..................................... 2025437

(51) Int. Cl.
*B07B 7/06* (2006.01)
*B07B 1/55* (2006.01)
(Continued)

(52) U.S. Cl.
CPC ................ *B07B 7/06* (2013.01); *B07B 11/02* (2013.01); *B07B 11/06* (2013.01)

(58) Field of Classification Search
CPC ........................................................ B07B 7/07
(Continued)

(56) References Cited

U.S. PATENT DOCUMENTS 1,509,909 A * 9/1924 Stebbins ................... B07B 4/08 209/474
2,769,544 A * 11/1956 Morrow ............. B65G 53/4691 209/474
(Continued)

FOREIGN PATENT DOCUMENTS

DE 2522148 A1 12/1976
EP 0759813 A1 3/1997
(Continued)

OTHER PUBLICATIONS

Search Report and Written Opinion from Dutch Application No. NL2025437, Mar. 30, 2021.

*Primary Examiner* — Michael McCullough
*Assistant Examiner* — Molly K Devine
(74) *Attorney, Agent, or Firm* — Workman Nydegger

(57) ABSTRACT

The invention relates to a screening device and a method for screening powders. The device comprises a screening space comprising a first chamber and a second chamber, which chambers are arranged adjacent and have a common partition wall. The device comprises a screen which is placed obliquely or vertically in the screening device, wherein the screen forms at least a part of the common partition wall. The first chamber comprises a raw material inlet, a drive gas inlet, a float gas unit, and a residual particle outlet. The second chamber comprises a product material outlet and a rotatable blade, wherein the blade comprises nozzles which are configured for blowing gas against the screen. In addition, the invention relates to an assembly comprising a first and second screening device, wherein the product material outlet of a first screening device is connected to the raw material inlet of the second screening device.

27 Claims, 6 Drawing Sheets

(51) Int. Cl.

| | |
|---|---|
| ***B07B 4/02*** | (2006.01) |
| ***B07B 4/08*** | (2006.01) |
| ***B07B 9/00*** | (2006.01) |
| ***B07B 11/02*** | (2006.01) |
| ***B07B 11/06*** | (2006.01) |
| ***B08B 5/02*** | (2006.01) |

(58) Field of Classification Search
USPC .......................................................... 209/136
See application file for complete search history.

(56) References Cited

U.S. PATENT DOCUMENTS

| | | | | |
|---|---|---|---|---|
| 3,685,651 | A * | 8/1972 | Gruber ...................... B07B 4/02 209/474 | |
| 4,251,355 | A | 2/1981 | Nelson et al. | |
| 4,461,702 | A | 7/1984 | Furukawa | |
| 4,699,710 | A * | 10/1987 | Williams ................ B07B 13/16 209/256 | |
| 2018/0354027 | A1 | 12/2018 | Ye et al. | |
| 2019/0170444 | A1 | 6/2019 | Magee et al. | |

FOREIGN PATENT DOCUMENTS

| | | | |
|---|---|---|---|
| GB | 775196 | A | 5/1957 |
| JP | H01189376 | A | 7/1989 |
| JP | 2002186908 | A | 7/2002 |

* cited by examiner

APPARATUS AND METHOD FOR SCREENING POWDERS

The invention relates to a screening device and a method for screening powders.

BACKGROUND

JP2002/186908A discloses a sieving device comprising a sieving space which is formed in a device housing. The sieving space is divided into an upper space of the sieving device and a lower space of the sieving device. In between the upper space and the lower space, a horizontally arranged sieving screen is provided. On a cover that closes the upper face of the upper space of the sieving device, a material injection port is provided thereon, while under this material injection port, a material dispersion plate is provided. To the lower space of the sieving device, a product outlet port is installed and a suction duct is connected thereto. In addition, in the lower space of the sieving device, a nozzle is positioned which blows air up to the sieving net while it is rotating under the sieving screen. In one side of the upper space of the sieving device, a residual particle exhaust port is provided for discharging the residual particles which did not pass through the screen. To this port, a door is provided so that an open/close condition can be selected.

In use, the residual particle exhaust port may be closed at a stage where the amount of residual particles is small and does not interfere with the sieving operation. The closed residual particle exhaust port also prevents the leaking of product particles. However, in time the amount of residual particles in the upper space gradually increases to a degree that they start to disturb the sieving operation. When this occurs, the residual particle exhaust port can be opened to discharge the residual particles all at once.

SUMMARY OF THE INVENTION

A disadvantage of the known technique is that the efficiency of the process gradually decreases in time because residual particles will accumulate on top of the screen which disturbs the sieving operation.

In addition, when the residual particle exhaust port is opened to discharge all the residual particles, it cannot be prevented that also product particles, which have not yet passed through the screen, will be discharged via the residual particle exhaust port.

It is an object of the present invention to at least partially obviate at least one of the problems of the current sieving devices or to provide at least an alternative device which provides a more efficient screening process, preferably with a better efficiency, and/or which allows to substantially prevent clogging during the screening process.

According to a first aspect, the present invention provides a new screening device wherein the device comprises:

- a screening space comprising a first chamber and a second chamber, wherein the first chamber and the second chambers are adjacent and have a common partition wall, and
- a screen, wherein the screen forms at least a part of the partition wall,
- wherein the first chamber comprises a raw material inlet and a residual particle outlet,
- wherein the second chamber comprises a product material outlet and a rotatable blade, wherein the rotatable blade comprises one or more nozzles which are configured for blowing gas against the screen,
- wherein the screen is placed obliquely or vertically, and wherein the first chamber further comprises a float gas unit, wherein the float gas unit is configured for, in use, providing an upwards directed gas flow in a part of the first chamber, and
- wherein the screening device is configured for, in use, providing a pressure difference between the first chamber and the second chamber such that the pressure in the second chamber is lower than the pressure in the first chamber.

According to the present invention, the screen is arranged in an oblique or vertical plane such that the residual particles, which do not pass through the screen, will slide off from the screen and accumulate below the screen. Accordingly, the residual particles will not accumulate on the screen as on the sieve in the prior art device, and the area of the screen will not get blocked by the residual particles.

In addition, the screen is cleaned by the gas from the rotating blade that blows gas via the nozzles against the screen. Since the rotatable blade is arranged in the second chamber, the nozzles are configured to blow the gas against the side of the screen which faces the second chamber. Accordingly, the gas from the nozzles is at least partially blown from the second chamber into the first chamber.

Therefore, in the screening device of the present invention the efficiency and/or throughput of the screening process will substantially not decrease in time.

However, when arranging the screen obliquely or vertically, the raw material including the particles which should traverse the screen will also predominantly slide off from the screen. In order to assist in screening the powders in the screening device of the present invention, the first chamber further comprises a float gas unit, wherein the float gas unit is configured for, in use, providing an upwards directed gas flow in a part of the first chamber. Accordingly, in use, the float gas unit is activated to provide an upwards flow configured for at least partially suspending or floating at least part of the particles of the powder in the first chamber, in particular in front of the screen, which assists in letting the particles of said powder with dimensions smaller than openings in the screen to pass through the screen into the second chamber. In addition, by providing, in use, a pressure difference between the first chamber and the second chamber such that the pressure in the second chamber is lower than the pressure in the first chamber, generates a gas flow from the first chamber to the second chamber, via the screen, which also assist the screening process.

The screening device of the present invention also works with screen comprising a mesh, in particular a metal mesh screen. However, in an embodiment, the screen comprises an array of openings with substantially the same dimensions, wherein each of said openings is configured such that a diameter of an opening at a side of the screen facing the first chamber is smaller than a diameter of said opening at a side of the screen facing the second chamber. Accordingly, the openings are preferably tapered in a direction towards the side of the screen facing the first chamber. Such a screen may, for example, be manufactured using 3D printing techniques. When a particle can fit through the diameter of the opening at the side of the screen facing the first chamber, it will substantially not be obstructed on its way to the second chamber.

It is noted that the pressure difference may be established by increasing the pressure if the first chamber and/or decreasing the pressure in the second chamber. In an embodiment, the second chamber or the product material outlet are configured for connecting a suction apparatus or vacuum pump for, in use, reducing the pressure in the second chamber. Accordingly, in use, a suction apparatus or vacuum pump can be arranged in fluid connection with the second chamber in order to reduce the pressure in the second chamber and establish the pressure difference between the first chamber and the second chamber.

In an embodiment, the raw material inlet is arranged at or near a top side of the first chamber, and wherein the float gas unit is arranged at or near a bottom side of the first chamber. Due to this arrangement the float gas unit is configured to provide, in use, a flow that is substantially in an opposite direction with respect to the flow of to be screened powder coming from the raw material inlet. This counter flow is configured for at least partially suspending or floating at least part of the particles of the powder in the first chamber, in particular in front of the screen.

In an embodiment, the float gas unit comprises a fan and/or a float gas inlet. In case the float gas unit comprises a fan, in use, the fan is activated to provide an upward flow in the first chamber for at least partially suspending or floating at least part of the particles of the powder in the first chamber, in particular in front of the screen. Preferably, the fan provides a turbulent gas flow and/or a whirling motion in the first chamber. In addition or alternatively, the float gas unit comprises a float gas inlet, which is configured to introduce, in use, a float gas into the first chamber to provide an upwards flow configured for at least partially suspending or floating at least part of the particles of the powder in the first chamber, in particular in front of the screen.

In an embodiment, the first chamber further comprises a drive gas inlet. The drive gas inlet allows to introduce a drive gas in the first chamber to more easily regulate a gas flow from the first chamber to the second chamber, which assist in the passing of the particles of said powder with dimensions smaller than openings in the screen through the screen into the second chamber.

In an embodiment, the drive gas inlet is arranged at or near a top side of the first chamber. In an alternative embodiment, the drive gas inlet is arranged in a side wall of the first chamber, preferably wherein the drive gas inlet is arranged substantially opposite to the partition wall or the screen.

In an embodiment, the screening device is configured for introducing the raw material into the first chamber together with a transport gas. The transport gas can assist the transport of the raw material into the first chamber. In addition, the transport gas can provide an addition to the drive gas for assisting the gas flow from the first chamber to the second chamber, and thereby assisting in the passing of the particles of said powder with dimensions smaller than openings in the screen through the screen into the second chamber.

In an embodiment, the residual particle outlet is arranged at or near a bottom side of the first chamber, and preferably adjacent to the partition wall or screen. Due to this arrangement large and/or heavy particles will fall downwards and are removed from the first chamber via the residual particle outlet.

In an embodiment, the angle of the screen with respect to the horizontal plane is between the 45 and 90 degrees, and preferably between the 80 and 90 degrees. In an embodiment the device is configure to comprise a vertical axis in the first chamber, wherein the vertical axis crosses with the screen at a position in a vertically lower part of the screen, and wherein the vertical axis is spaced apart from the screen at a position in a vertically upper part of the screen. This prevents particles from remaining on the screen and the particles which do not pass through the screen are now easily transferred to the residual particle outlet.

In an embodiment, the product material outlet is located at a bottom of the second chamber. Accordingly, the removal of the product material out of the second chamber is assisted by gravity.

In an embodiment, the screening device comprises an actuator which is configured to rotate the rotatable blade in front of the screen. In an embodiment, the actuator comprises an electric motor to rotate the rotatable blade in front of the screen, in order to clean at least a large part of the surface of the screen or, preferably, the complete surface of the screen.

In an embodiment, the float gas, the gas for the rotatable blade, the drive gas and/or the transport gas are inert gasses, preferably argon or nitrogen. This substantially prevents corrosion of the particle material in the screening device. If the powder material is not sensitive to corrosion then air is suitable to use for the float gas, the gas for the rotatable blade, the drive gas and/or the transport gas.

In an embodiment, the same gas is used as a float gas, as the gas for the rotatable blade, as the drive gas and/or as transport gas. Accordingly, in this embodiment it is not required to provide sources for multiple different gasses, which makes the use of the screening device of the present invention more easy and more economical.

In an embodiment, the screening device further comprises a cyclone unit which is attached to the product material outlet, wherein the cyclone unit is configured for substantially separating screened particles from a gas stream. The gasses introduced in the first chamber and the part thereof which flows into the second chamber, leaves the screening device with the product material via the product material outlet. In order to obtain the product material, it is necessary to separate this product material from this gas flow. This can be established by the cyclone unit.

In an embodiment, the cyclone unit comprises:

a chamber for separating the screened particles and the gas stream, a gas outlet for the gas stream, and a cyclone material outlet.

According to a second aspect, the invention provides screen for use in a screening device or an embodiment thereof as described above, wherein the screen comprises an array of openings with substantially the same dimensions, wherein each of said openings is configured such that a diameter of an opening at a side of the screen facing the first chamber is smaller than a diameter of said opening at a side of the screen facing the second chamber. In an embodiment, said screen is obtained by additive manufacturing, preferably obtained by 3D printing.

According to a third aspect, the invention provides an assembly for screening powder, wherein said assembly comprising a first screening device according to the first aspect of the invention or an embodiment thereof as described above, and a second screening device according to the first aspect of the invention or an embodiment thereof as described above, wherein the assembly further comprises a connection between the raw material inlet of the second screening device and the product material outlet of the first screening device.

Accordingly, the first screening device and the second screening device are concatenated. Such a concatenation of the two screening devices is also denoted as a cascade system. In such a cascade system the openings in the screen of the second screening device are preferably equal or smaller than the openings in the screen of the first screening device. This cascades system can also be extended to three or more screening devices.

The assembly according to the present invention allows to split the raw powder material in at least three fractions:

a first fraction of particles with dimensions larger than the openings in the screen of the first screening device, a second fraction of particles with dimensions smaller than the openings in the screen of the first screening device, and larger than the openings in the screen of the second screening device, and a third fraction of particles with dimensions smaller than the openings in the screen of the second screening device.

More fractions can be obtained by adding more screening devices with decreasingly smaller openings in their screen.

Accordingly, by selecting the proper screens with proper openings, a fraction of particles with dimensions within a desired range can be separated from the raw powder material.

In an embodiment, the first chamber of the first screening device and first chamber of the second screening device both comprise a drive gas inlet. As discussed above, the drive gas inlet allows to introduce a drive gas in the first chamber to more easily regulate a gas flow from the first chamber to the second chamber which assist in the passing of the particles of said powder with dimensions smaller than openings in the screen through the screen into the second chamber. Proving both the first and second screening devices with their own drive gas inlet allows to optimize the gas flow between the first and second chamber of the first and second screening device individually.

In an embodiment, the connection between the product material outlet of the first screening device and the raw material inlet of the second screening device comprises a buffer device, wherein the buffer device is configured for collecting the product material of the first screening device and for dosing and transferring said product material to the second screening device. Due to the buffer device, the input flow of material into the second screening device can be made substantially independent from the output flow of material from the first screening device. Accordingly, the dosing and transferring of material into the second screening device can be optimized for screening the material in the second screening device.

In an embodiment, wherein a cyclone unit is arranged between the product material outlet of the first screening device and the buffer device, preferably wherein the cyclone material outlet is connected to a product material inlet of the buffer device. By arranging the cyclone unit between the first screening device and the buffer device, the gas stream from the product material outlet of the first screening device is separated from the product material and the second screening device can be operated substantially independent from the gas stream from the product material outlet of the first screening device.

In an embodiment, the assembly further comprises a suction apparatus or vacuum pump which is arranged in fluid connection to the second chamber of the second and/or the first screening device.

According to a fourth aspect, the invention provides, a method for screening powder using a screening device according to the first aspect of the invention or an embodiment thereof as described above or an assembly according to the second aspect of the invention or an embodiment thereof as described above, wherein the method comprising the steps of:

providing powder in the first chamber via the raw material inlet, wherein the powder comprises an assembly of particles having a variety of dimensions;

activating a float gas unit in the first chamber to provide a counter flow configured for at least partially suspending or floating at least part of the particles of the powder in the first chamber;

blowing gas against the screen by means of one or more nozzles of the rotating blade;

providing a pressure difference between the first chamber and the second chamber such that the pressure in the second chamber is lower than the pressure in the first chamber; and allowing the particles of said powder with dimensions smaller than openings in the screen to pass through the screen into the second chamber, wherein the particles arriving in a second chamber are part of a product material which exits the second chamber via the product material outlet.

Accordingly, the screen is cleaned by the gas from the rotating blade that blows gas via the nozzles against the screen. To clean at least large part of the surface of the screen or preferably the complete surface of the screen, the rotatable blade rotates powered by an actuator, such as an electric motor.

In an embodiment, wherein the screening device comprises a drive gas inlet, the method further comprises the step of:

introducing a drive gas in the first chamber via the drive gas inlet to create or enhance a gas flow from the first chamber into the second chamber.

In an embodiment, wherein the screening device comprises a cyclone unit, the method further comprises the step of:

separating the product material from the gas stream using a cyclone unit, preferably wherein the product material leaves the cyclone unit substantially via the cyclone material outlet, while the gas stream leaves the cyclone unit via the gas outlet.

In an embodiment using an assembly according to the second aspect of the invention or an embodiment thereof as described above, the product material of the first screening device is at least partially lead into the raw material inlet of the second screening device.

In an embodiment, the product material of the first screening device is at least partially collected in a buffer device, wherein the product material in the buffer device is dosed and transferred to the raw material inlet of the second screening device.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1:
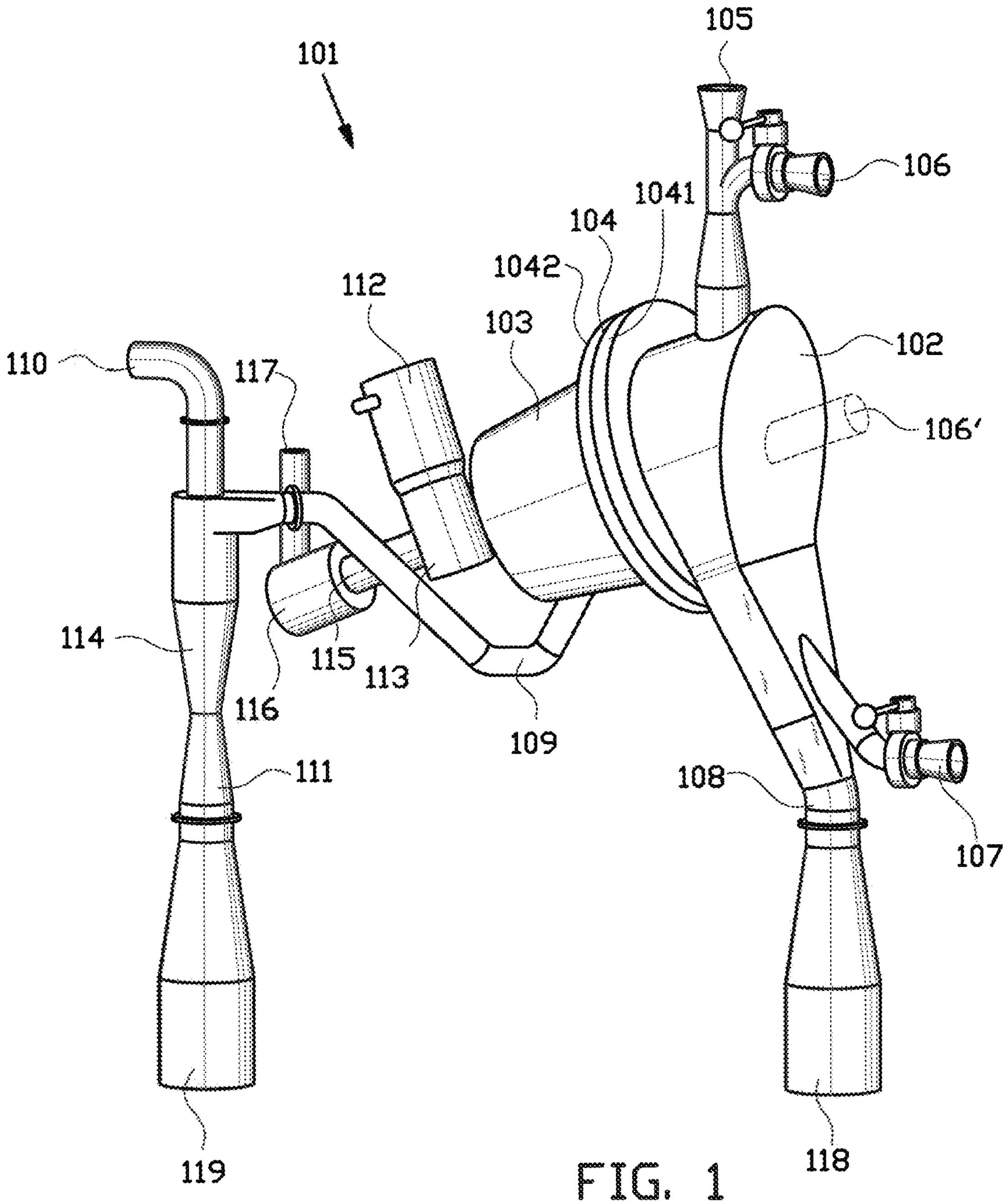
FIG. 1 shows a schematic view of a first example of a screening device according to the present invention.

FIG. 1 shows a schematic view of a first example of a screening device 101 according to the present invention. The screening device 101 comprises, a first chamber 102 and a second chamber 103. The two chambers are adjacent and have a common partition wall 104. At least a part of the partition walls 104 is formed by a screen (not shown). In the example shown in FIG. 1, the first chamber 102 comprises a first flange 1041 at a side facing the second chamber 103, and the second chamber 203 comprises a second flange 1042 at a side facing the first chamber. The first chamber 102 and the second chamber 103 can be connected to each other by connecting the first flange 1041 to the second flange 1042. The screen (not shown) can then be clamped in between the first flange 1041 and the second flange 1042 to form the partition wall 104.

The first chamber 102 comprises several inlets and an outlet, namely a raw material inlet 105, a drive gas inlet 106, 106', a float gas inlet 107 and a residual particle outlet 108. It is noted, that in this example, the float gas unit only comprises a float gas inlet 107.

As schematically indicated in FIG. 1, the raw material inlet 105 is arranged at or near a top side of the first chamber 102. At least in use, the raw material inlet 105 is connected with a raw material supply (not shown). The raw material supply may be provided with a transport gas supply, which is configured so that the transport gas assists in the transport of the raw material from the raw material supply into the first chamber 102 via the raw material inlet 105.

The residual particle outlet 108 is arranged to or near a bottom side of the first chamber 102. In particular, the bottom side of the first chamber 102 is configured to provide a substantially smooth transition to the residual particle outlet 108. Also the float gas inlet 107 is arranged at or near a bottom side of the first chamber 102, and is preferably configured to direct a jet of float gas in an upward direction in order to provide a counter-flow against the flow of raw material from the raw material inlet 105. Preferably, in use, the jet of float gas is configured to bring at least part of the raw material in a substantially floating condition adjacent to the partition wall 104 or the screen.

In order to further assist in the screening of the raw material, the first chamber 102 further comprises a drive gas inlet 106, 106'. This drive gas inlet 106 may be arranged at or near a top side of the first chamber 102 or may be combined with the raw material inlet 105, and/or this drive gas inlet 106' may be arranged in a side wall of the first chamber 102, preferably at a position substantially opposite to the partition wall 104 or the screen. By adding the drive gas in the first chamber 102, the gas pressure in the first chamber 102 is increased, and when the gas pressure in the first chamber 102 is larger than the gas pressure in the second chamber 103, a gas flow through the screen will be establish which gas flow assists in the screening of the raw material by taking along sufficiently small raw material particles from the first chamber 102 to the second chamber 103. This effect may be further increased by using the drive gas inlet 106' which is arranged opposite to the screen. By using this drive gas inlet 106', this drive gas inlet 106' can be configured to provide a jet of drive gas which pushes the raw material towards the screen.

As further schematically shown in FIG. 1, the partition walls 104 and the screen arranged therein is arranged in a nearly vertical orientation. Preferably the partition walls 104 and the screen are arranged at an angle with respect to a horizontal plane of between the 80 and 90 degrees. In addition, the screening device 101 is configured so that a vertical central axis of the raw material inlet 105 in the first chamber, crosses the screen at a position in a vertically lower part of the first chamber 102, and wherein this vertical central axis is spaced apart from the screen at a position in a vertically upper part of the first chamber 102, wherein the partition wall 104 and the screen are arranged in between the vertical central axis and the second chamber 103, at least in the vertically upper part of the first chamber 102.

The second chamber 103 is comprises a product material outlet 109. In the second chamber a rotatable blade is arranged, which is described in more detail below with reference to FIG. 2. The rotatable blade comprises one or more nozzles which are directed towards the screen and which are configured for blowing a gas stream against the screen. In this example, the rotatable blade is mounted on a hollow axis 115 which extends out of the second chamber 103 at a side facing away from the screen and facing away from the first chamber 102.

Outside the second chamber 103, an actuator 113 is arranged for rotating the axis 115. With the rotation of the axis 115, the rotatable blade is also rotated in front of the screen for cleaning substantially the whole area of the screen. The actuator 113 may be a pneumatic driven actuator, but preferably the actuator 113 comprises an electro motor 112.

Furthermore, the hollow axis 115 is coupled to a rotatable coupling 116 or swivel coupling for connecting a fixed gas supply pipe 117 to the rotatable hollow axis 115. Preferably, as indicated in the FIG. 1, the rotatable coupling 116 is arranged at a distal end of the hollow axis 115, at a side of the actuator 113 facing away from the second chamber 103. The fixed gas supply pipe 117 is, at least in use, in fluid connection with a screen cleaning gas supply.

As schematically shown in FIG. 1, a cyclone separator 114 is connected to the product material outlet 109. The cyclone separator 114 comprises a gas outlet 110 and a cyclone material outlet 111.

Accordingly, the screening device 101 allows to divided the raw material from the raw material input 105 into two fractions;

the residual material with dimensions larger than the openings in the screen, which exits the screening device 101 via the residual material output 108 into a residual material container 118, and the product material with dimensions smaller than the openings in the screen, which exits the screening device 101 via the product material outlet 109, and the cyclone material outlet 111 into a product material container 119.

The working of the screening device of the present invention will be described below, with reference to FIG. 2A.

Figure 2B:
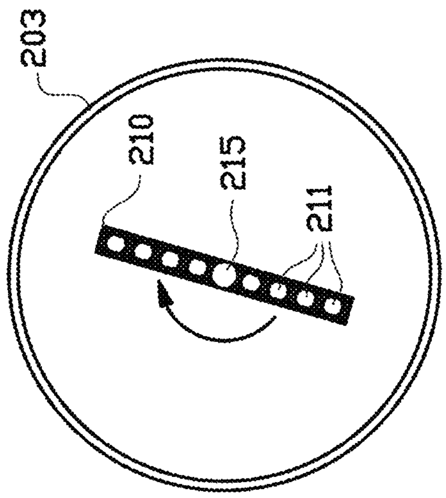
FIG. 2B shows a schematic cross-section along the line IIB-IIB of the example of FIG. 2A.
Figure 2A:
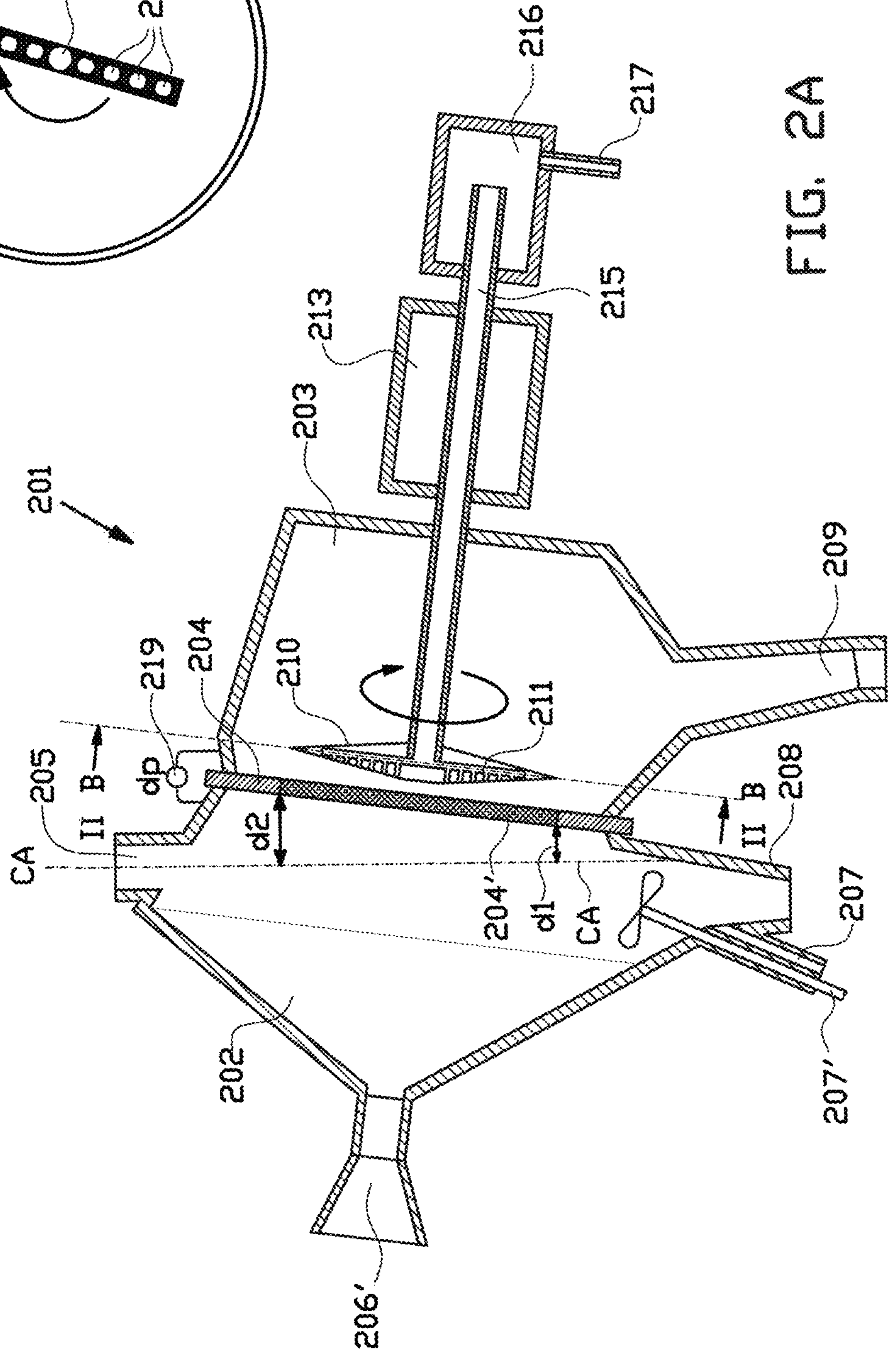
FIG. 2A shows a schematic cross-section of an example of a screening device according to the present invention.

FIG. 2A shows a schematic cross-section of an example of a screening device 201 according to the present invention. The screening device 201 comprises, a first chamber 202 and a second chamber 203. The two chambers are adjacent and have a common partition wall 204. At least a part of the partition walls 204 is formed by a screen 204'.

In this example, the float gas unit comprises both a fan 207' and a float gas inlet 207, and one or both can be used for providing an upward flow in the first chamber 202 for at least partially suspending or floating at least part of the particles of the powder in the first chamber 202, in particular in front of the screen 204'.

The first chamber 202 comprises several inlets and an outlet, namely a raw material inlet 205, a drive gas inlet 206', the float gas inlet 207 and a residual particle outlet 208. The raw material inlet 205 is arranged at or near a top side of the first chamber 202. The residual particle outlet 208 is arranged to or near a bottom side of the first chamber 202.

Also the float gas inlet 207 and the fan 207' are arranged at or near a bottom side of the first chamber 202, and both are configured to provide a jet of float gas in an upward direction in order to provide a counter-flow against the flow of raw material from the raw material inlet 205. Preferably, in use, the fan 207' and/or the float gas introduced by the float gas inlet 207 are configured to bring at least part of the raw material in a substantially floating condition adjacent to the partition wall 204 or the screen 204'.

In order to further assist in the screening of the raw material, the first chamber 202 further comprises a drive gas inlet 206', which is arranged in a side wall of the first chamber 202, at a position opposite to the screen 204'.

As further schematically shown in FIG. 2A, the partition walls 204 and the screen 204' arranged therein is arranged at an angle with respect to a horizontal plane of approximately 80 degrees. In addition, the screening device 201 is configured so that a vertical central axis CA of the raw material inlet 205 in the first chamber 202 is arranged spaced apart from the screen 204' at a distance d1 in a vertically lower part of the first chamber 202, and this vertical central axis CA is spaced apart from the screen 204' at a distance d2 in a vertically upper part of the first chamber 202, wherein the distance d2 is larger than the distance d1, and wherein the screen 204' is arranged in between the vertical central axis CA and the second chamber 203.

The second chamber 203 is comprises a product material outlet 209. In the second chamber a rotatable blade 210 is arranged. The rotatable blade 210 comprises one or more nozzles 211 which are directed towards the screen 204' and which are configured for blowing a gas stream against the screen 204'. The rotatable blade 210 is mounted on a hollow axis 215 which extends out of the second chamber 203 at a side facing away from the screen 204' and facing away from the first chamber 202.

Outside the second chamber 203, an actuator 213 is arranged for rotating the axis 215. With the rotation of the axis 215, the rotatable blade 210 is also rotated in front of the screen 204' for cleaning substantially the whole area of the screen 204'. As schematically shown in FIG. 2B, the rotatable blade 210 comprises a narrow beam with nozzles 211, which narrow beam extends in opposite radial directions from the axis 215.

Furthermore, the hollow axis 215 is coupled to a rotatable coupling 216 or swivel coupling for connecting a fixed gas supply pipe 217 to the rotatable hollow axis 215. The rotatable coupling 216 is arranged at a distal end of the hollow axis 215, at a side of the actuator 213 facing away from the second chamber 203. The fixed gas supply pipe 217 is, at least in use, in fluid connection with a screen cleaning gas supply.

The screening device 201 comprises one or more pressure sensors 219, which are configured for measuring at least a difference in the gas pressure dp between the first chamber 202 and the second chamber 203.

In use, a to be sifted powder is introduced in the screening device 201 via the raw material inlet 205. At the same time a pressurized float gas is introduced into the first chamber 202 via the float gas inlet 207. This pressurized float gas is directed in an upwards direction and creates a gas stream which causes a counter flow against the gravitational force. This counter flow is configured so that at least part of the particles in the to be screened powder are lifted and float in front of the screen 204' in the first chamber 202. The particles which are too heavy and where the downwards force is larger than the upwards force will fall into the residual particle outlet 208.

In addition or alternatively, the fan 207' is activated to provide an upward flow along the screen 204'. This upward flow is configured so that at least part of the particles in the to be screened powder are lifted and float in front of the screen 204' in the first chamber 202. The particles which are too heavy and where the downwards force is larger than the upwards force will fall into the residual particle outlet 208. It is noted, that when using the fan 207', the use of an additional float gas and/or the float gas inlet 207 is not necessary and can be omitted.

By adding the drive gas in the first chamber 202, the gas pressure in the first chamber 202 is increased, and when the gas pressure in the first chamber 202 is higher than the gas pressure in the second chamber 203, a gas stream will flow from the first chamber 202, through the screen 204', into the second chamber 203. This gas stream will take along particles with dimensions small enough to traverse the openings in the screen 204'. The larger particles remain in the first chamber 203 and will exit the screening device 201 via the residual particle outlet 208. The particles which have traversed the screen 204' will arrive in the second chamber 203 and will exit the screening device 201 via the product material outlet 209.

In the screening device 201 as shown in FIG. 2, the drive gas inlet 206' is configured to direct a jet of drive gas from the drive gas inlet 206' towards the screen 204'. By using this jet of drive gas, the raw material is pushed towards the screen 204'.

Accordingly, the to be sifted powder is divided into two fractions; the residual material with dimensions larger than the openings in the screen, and the product material with dimensions smaller than the openings in the screen.

In order to control the transport of particles through the screen 204', the pressure difference dp between the first chamber 202 and the second chamber 203 can be increased and/or controlled by introducing an additional amount of drive gas in the first chamber 202. In addition or alternatively, the pressure difference dp between the first chamber 202 and the second chamber 203 can be increase and/or controlled by removing gas from the second chamber 203, for example by connecting the product material outlet 209 to a suction apparatus or vacuum pump.

Furthermore, in order to substantially prevent clogging of the screen 204' by particles, the rotatable blade 210 comprises one or more nozzles 211 which blow a gas stream against the surface of the screen 204' facing the second chamber 203. The gas stream from the rotatable blade 210 is directed in an opposite direction with respect to the gas stream from the first chamber 202 to the second chamber 203 which takes along the particles through the screen 204'. Accordingly, at the position where the one or more nozzles 211 of the rotatable blade 210 is directed onto the screen 204', the particles are blown back into the first chamber 202 in order to substantially remove any clogged particles. It is noted that the counter flow by the gas from the rotatable blade 210 is substantially limited to the position on the screen 204' where the one or more nozzles 211 of the narrow beam shaped rotatable blade 210 are directed to. In the remaining part of the screen 204', the gas stream is predominantly from the first chamber 202 to the second chamber 203 which takes along the particles through the screen 204'. Accordingly, the screening device 201 of the present invention provides a continues operation of screening material through the screen 204' and cleaning the part of the screen 204' to which the rotatable blade 210 is directed.

Figure 3:
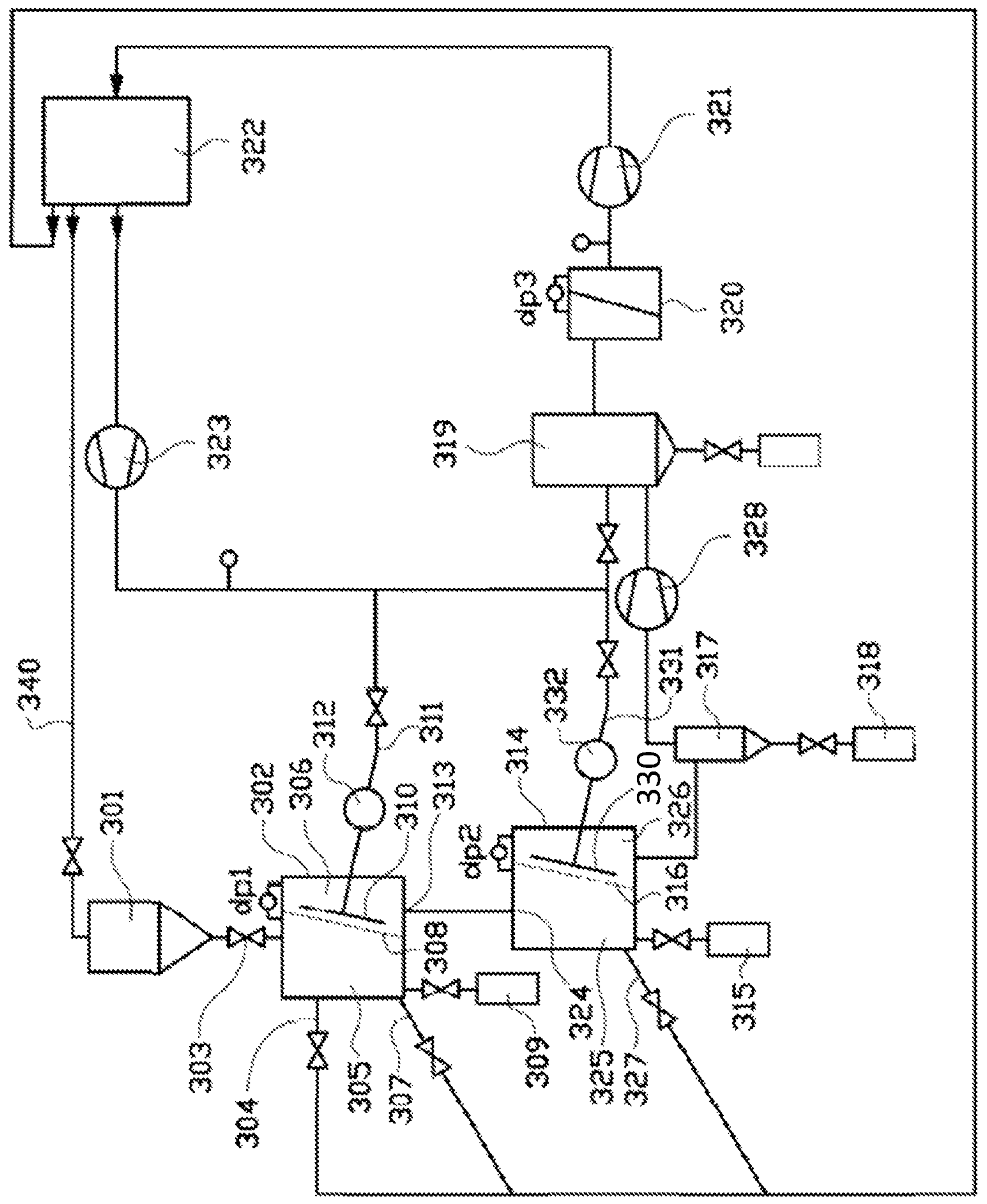
FIG. 3 shows a schematic process scheme of a first example of an assembly according to the present invention.

FIG. 3 shows a schematic process scheme of an example of an assembly according to invention in which two screening devices are arranged in a cascade system. A powder buffer 301 provides the first screening device 302 via a dosing valve 303 with powder consisting of fine particles with a variety of particle sizes. The float gas supply 307 creates a counter flow which will lift the particles in front of the screen 308. The particles which are too large and/or too heavy, and where the downwards force (gravity) is larger than the upwards force (jet of float gas) will fall into the residual particle container 309.

The drive gas supply 304 introduces a drive gas into the first chamber 305 in order to create a higher pressure in the first chamber 305 than in the second chamber 306. This pressure difference dp1 creates a gas stream which flows from the first chamber 305 into the second chamber 306, which gas stream takes along particles with a size smaller than the openings in the screen 308. Accordingly, the powder which is inputted in the first chamber 305 is spit in a fraction of particles with a size smaller than the openings in the screen 308, which end up in the second chamber 306, and particles with a size larger than the openings in the screen 308, which remain in the first chamber 305 and exit the first screening device 302 via the residual particle outlet and end up in the residual particle container 309.

In order to substantially prevent that the screen 308 clogs up, a rotatable blade 310 is arranged in the second chamber 306. The rotatable blade 310 is provided with one or more nozzles which in use blow a cleaning gas against the screen 308 to clean the screen 308. The gas nozzles of the rotatable blade 310 are connected to a compressed gas supply 311. In order to clean the screen in phases the rotatable blade rotates in front of the screen, which rotation is powered by an electric motor 312.

The particles transmitted through the screen 308 leave the first screening device 302 via the product material outlet 313. These particles and at least part of the gas which has flown from the first chamber to the second chamber of the first screening device, enter the second screening device 314 via the particle inlet 324. Because of the combination of particles and gas from the first screening device 302 which enter the second screening device 314, and by carefully selecting the proper working conditions of the first and second screening devices, the second screening device 314 can be run without an additional drive gas supply in the first chamber 325 of the second screening device 314. However, in case it proves to be difficult to obtain the required pressure difference dp2 between the first and second chamber in the second screening device 314, the first chamber 325 of the second screening device 314 may be provided with a drive gas supply and/or the second chamber 326 of the second screening device 314 is arranged in fluid connection with a suction device 328 via a cyclone unit 317.

The procedure in the second screening device 314 follows the same principle as in the first screening device 302, only the openings in the screen 316 of the second screening device 314 are preferably smaller than the openings in the screen 308 of the first screening device 302. The float gas supply 327 creates a counter flow against the downwards falling particles coming from the particle inlet 324 and which float gas will provide lift to the particles in front of the screen 316. Accordingly, particles with a size smaller than the openings in the screen 308 of the first screening device 302, but with a size larger than the openings in the screen 316 of the second screening device 314 remain in the first chamber 325 of the second screening device 314 and end up in the residual particle container 315 of the second screening device 314. Particles with a size smaller than the openings in the screen 316 of the second screening device 314 are transmitted through the screen 316 and exit the second screening device 314 via a product material outlet and are directed to the cyclone unit 317 to separate the gas stream from the particles used as product material. The product material is stored in a product material container 318 and the gas stream is then filtered by an automatic cleaning filter 319 and a HEPA filter 320 to remove any residual particles and to clean the gas. The clean gas is moved via a blower 321 and is stored in a gas buffer 322.

Again, in order to substantially prevent that the screen 318 clogs up, a rotatable blade 330 is arranged in the second chamber 326 of the second screening device 314. The rotatable blade 330 is provided with one or more nozzles which in use blow a cleaning gas against the screen 316 to clean the screen 316. The gas nozzles of the rotatable blade 330 are connected to a compressed gas supply 331. In order to clean the screen in phases the rotatable blade rotates in front of the screen, which rotation is powered by an electric motor 332.

The gas from the gas buffer 322 can then be re-used as float gas and/or drive gas in the first and/or second screening device. In addition, the gas from the gas buffer 322 is also used as cleaning gas in the rotatable blades of the first and second screening devices. If necessary, the pressure of the cleaning gas can be increased using the compressor 323 to provide a desired pressure of cleaning gas from the nozzles of the rotatable blades.

In addition, the gas buffer 322 is also be connected to the powder buffer 301 via a transport gas supply conduit 340. The transport gas supply conduit 340 allows to introduce a transport gas into the powder buffer 301, which transport gas may assist in moving the powder from the powder buffer 301 into the first chamber 305 of the first screening device 302.

If, for example, the screen 308 of the first screening device 302 has openings of 100 micron and the screen 316 of the second screening device 314 has openings of 50 micron, the residual particle container 309 of the first screening device 302 comprises particles with dimensions of 100 micron and larger, the residual particle container 315 of the second screening device 314 comprises particles with dimensions between 50 and 100 micron, and the product material container 318 comprises particles with dimensions smaller than 50 micron.

The operation of each of the first and second screening devices is preferably controlled by controlling the pressure difference dp1, dp2 over the corresponding screen 308, 316 and by controlling the amount of inflow of raw material into the respective first chamber 305, 325 of the screening device 302, 314.

It is noted that in the assembly as shown in FIG. 3, the amount of inflow of material in the first chamber 325 of the second screening device 314 is equal to the amount of outflow of product material from the product material outlet 313 of the first screening device 302. Accordingly, in this example the amount of inflow of material in the first chamber 325 of the second screening device 314 cannot actively be controlled.

It is noted that in this example, the float gas unit of each screening device 302, 314 only comprise a float gas inlet 307, 327. However, in addition or instead, the float gas unit of one or more of the screening devices 302, 314 may comprise a fan as described above with reference to FIG. 2A.

Figure 4:
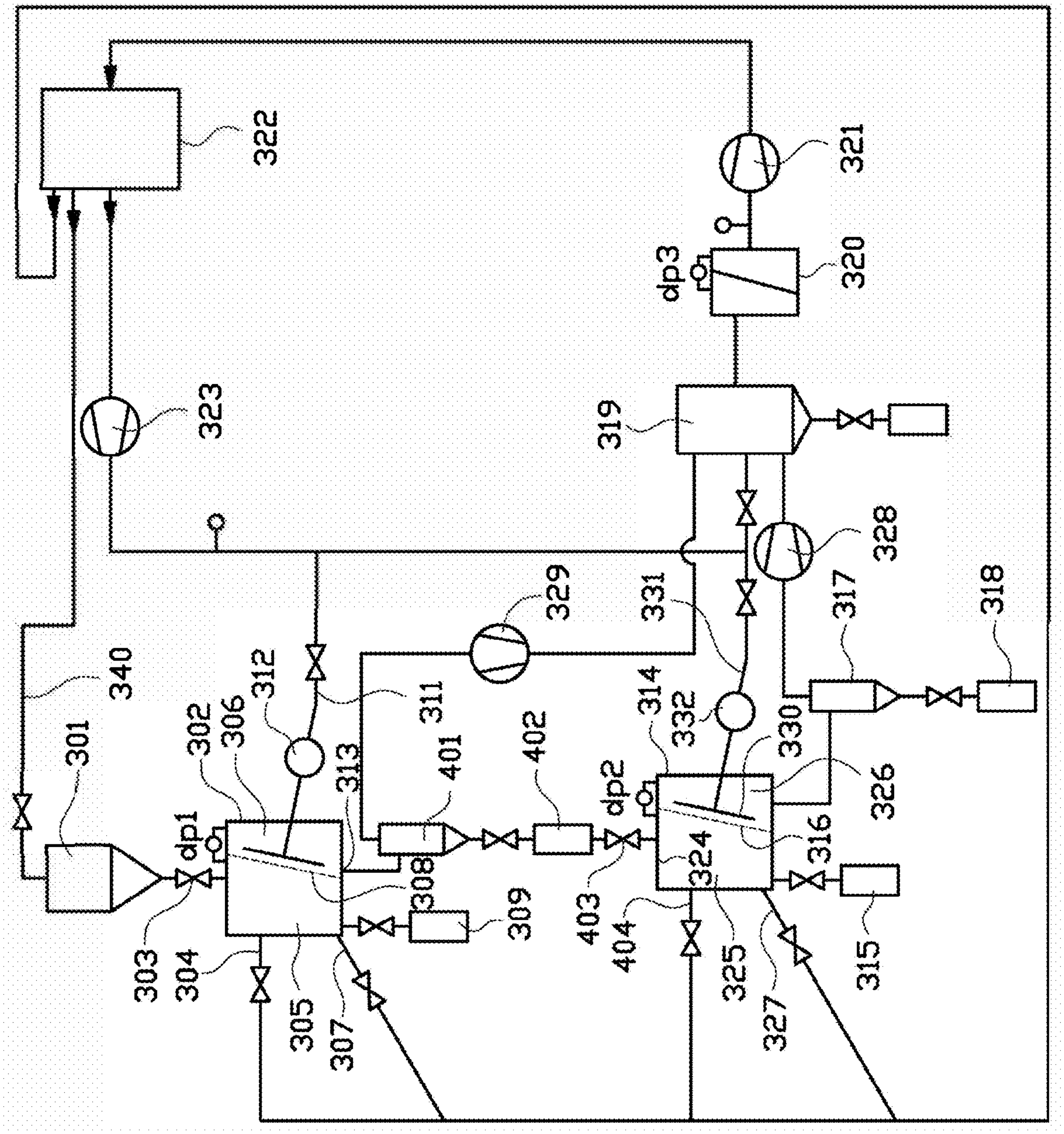
FIG. 4 shows a schematic process scheme of a second example of an assembly according to the present invention, FIG. 5 schematically shows an example of a size distribution of powder particles as obtained by an assembly of the present invention, and a size distribution of powder particles as created using powder from different fractions of the original distribution.

A second example of an assembly according to the present invention, which allows to actively control the inflow of material in the first chamber 425 of the second screening device is shown in FIG. 4. FIG. 4 shows schematically an alternative cascade system, in which the same features as already described above in relation with the first example of an assembly according to the present invention, are provided with the same reference numbers. The product material outlet 313 of the first screening device 302 is connected to a cyclone unit 401 where the particles and the gas stream from the product material outlet 313 of the first screening device 302 are separated. The particles are directed to and stored in an intermediate buffer 402, and the gas is directed to the automatic cleaning filter 319. The particles from the intermediate buffer 402 are dosed and directed to the first chamber 325 of the second screening device 314 via a dosing valve 403. As shown in FIG. 4, the second screening device also comprises a drive gas supply 404, which is configured for increasing the pressure in the first chamber 325 of the second screening device 314 in order to obtain the desired pressure difference dp2 between the first chamber 325 and the second chamber 326 of the second screening device 314.

In case it proves to be difficult to obtain the required pressure difference dp1 between the first and second chamber in the first screening device 302, the second chamber 306 of the first screening device 302 is arranged in fluid connection with a suction device 329 via the cyclone unit 401.

Since the screening devices according to the present invention are based on the principle of floating the particles in front of the screen, one would expect that this technology only works with particles having a low density. However, the inventor found that this technology also works very well with particles having a relatively large density, such as metal particles, and in particular metal particles for use for three-dimensional printing of metal objects.

Figure 5:
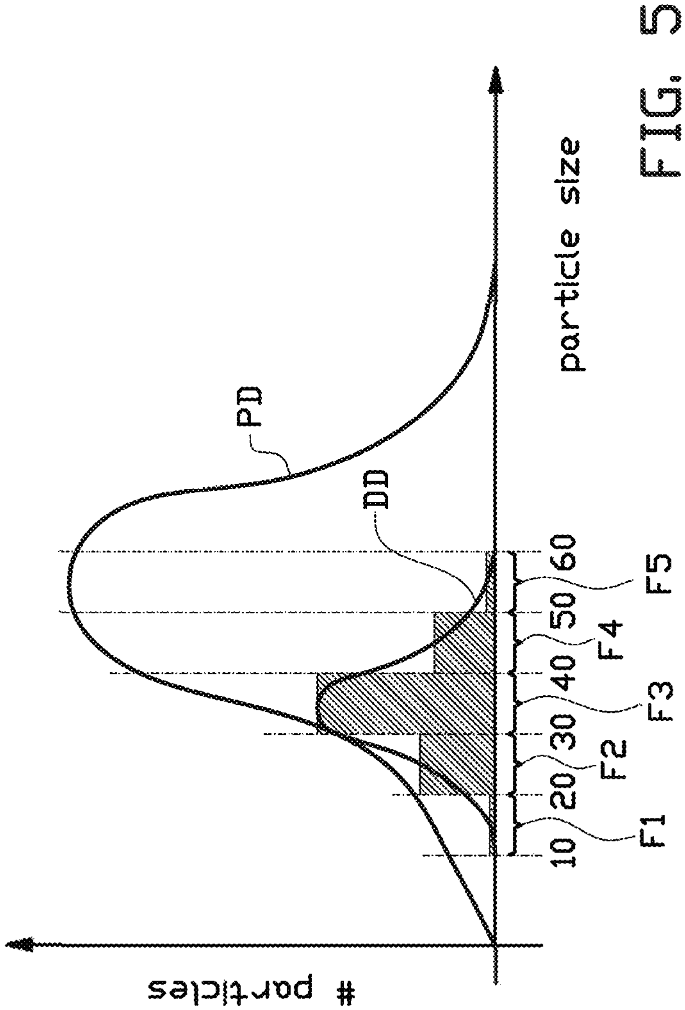

By adding further screening devices with screens having different opening sizes, the incoming raw material can be split in different fractions. For example, if the raw material comprises a powder with a certain particle size distribution PD, as schematically shown in FIG. 5, this particle size distribution PD may not a suitable distribution for use, for example, in a three-dimensional printing apparatus. The previous examples showed assemblies for screening the powder in different fractions F1, F2, F3, which number of fractions may be enlarged by adding further screening devices with the appropriate screens. Accordingly, in an embodiment, the assembly for screening powder according to the invention allows to separate the produced powder with powder particles with the certain size distribution PD in several different fractions F1, F2, F3, F4, F5. By combining different amounts of powder from one or more of these several different fractions F1, F2, F3, F4, F5, a powder with size distribution equal or close to a desired distribution DD can be obtained.

Figure 6A:
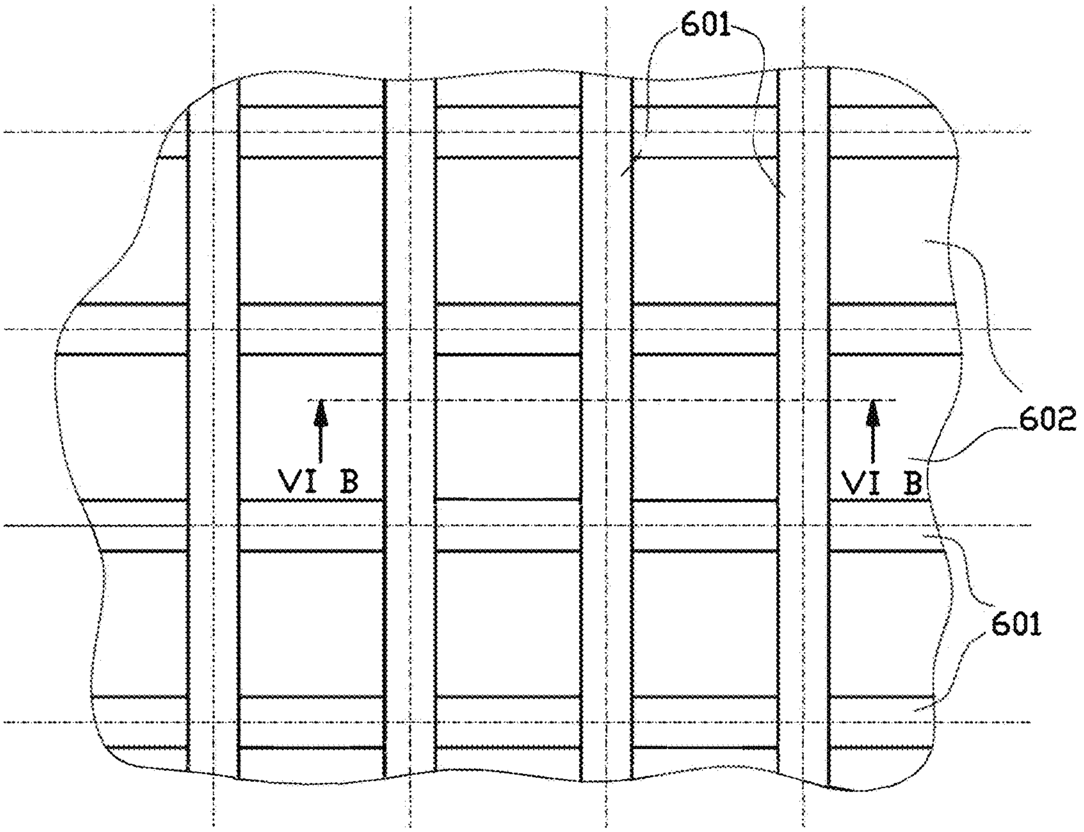
FIGS. 6A and 6B show a schematic top view and cross-section of a first example of a screen for use in a screening device according to the present invention, and FIG. 7 show a schematic cross-section of a second example of a screen for use in a screening device according to the present invention.
Figure 6B:
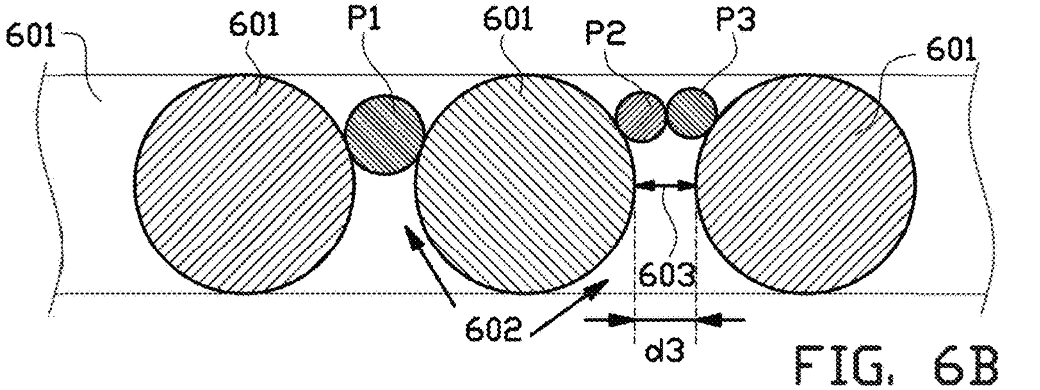

The screening device of the present invention also works with screen comprising a mesh, in particular a metal mesh screen, as schematically shown in FIG. 6A. The mesh screen comprises metal wires 601 arranged in an orthogonal array which defines substantially rectangular opening 602 in the screen. As indicated in the cross section view of FIG. 6B, the round metal wires of the mesh screen result in a through opening that is funnel-shaped and comprises a narrow neck 603 with a smallest distance d3. Due to this funnel-shape, particles P1, P2, P3 trying to pass the screen may can get wedged and may block the passing of smaller particles through the screen. By using the rotatable blade as in the screening devices of the present invention, which rotatable blade comprises one or more nozzles which are configured for blowing gas against the screen, the wedged particles can be removed.

Figure 7:
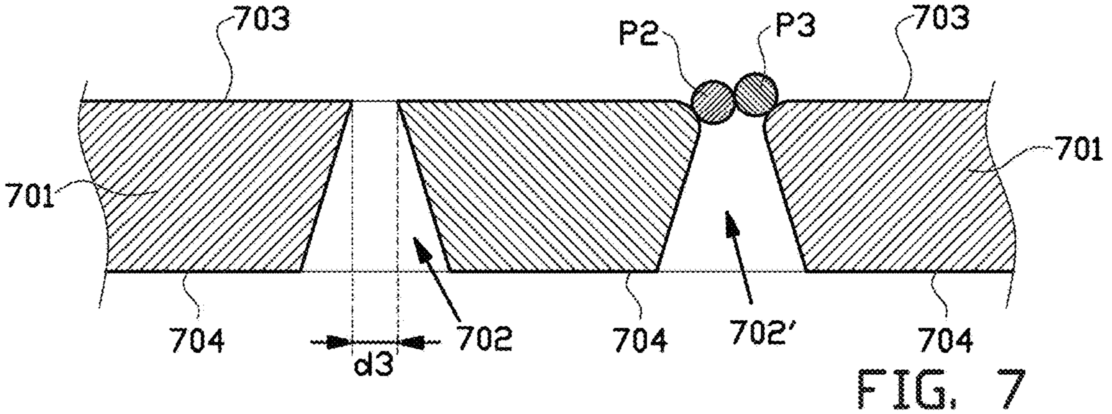

In a new screen design according to the present invention as shown schematically in the cross-section of FIG. 7, the screen 701 comprises an array of openings with substantially the same dimensions, wherein each of said openings 702 is configured such that a diameter d3 of an opening at a side 703 of the screen facing the first chamber is smaller than a diameter of said opening at a side 704 of the screen facing the second chamber. As shown in FIG. 7, the openings 702 are preferably tapered in a direction towards the side 703 of the screen facing the first chamber. Such a screen may, for example, be manufactured using 3D printing techniques. When a particle can fit through the diameter d3 of the opening at the side 703 of the screen facing the first chamber, it will substantially not be obstructed on its way to the second chamber.

If, however, the openings 702' do not have their smallest diameter at the side 703, but have rounded edges, particles P2, P3 can still get wedged at said rounded edges. However, changes that particles P2, P3 get wedged in such an opening 702' is greatly reduced, when compared to the mesh screen of FIG. 6B, and also these wedged particles can be removed by the rotatable blade.

In summary, the invention relates to a screening device and a method for screening powders. The device comprises a screening space comprising a first chamber and a second chamber, which chambers are arranged adjacent and have a common partition wall. The screening device comprises a screen which is placed obliquely or vertically in the screening device, wherein the screen forms at least a part of the partition wall. The first chamber comprises a raw material inlet, a drive gas inlet, a float gas unit, and a residual particle outlet. The second chamber comprises a product material outlet and a rotatable blade, wherein the blade comprises nozzles which are configured for blowing gas against the screen. In addition, the invention relates to an assembly comprising a first and second screening device, wherein the product material outlet of a first screening device is connected to the raw material inlet of the second screening device.

It is to be understood that the above description is included to illustrate the operation of the preferred embodiments and is not meant to limit the scope of the invention. From the above discussion, many variations will be apparent to one skilled in the art that would yet be encompassed by the scope of the present invention as defined in the claims.

The invention claimed is:

1. A screening device for screening powders, wherein said device comprises:

a screening space comprising a first chamber and a second chamber, wherein the first chamber and the second chambers are adjacent and have a common partition wall, and a screen, wherein the screen forms at least a part of the partition wall, wherein the first chamber comprises a raw material inlet and a residual particle outlet, wherein the second chamber comprises a product material outlet and a rotatable blade, wherein the rotatable blade comprises one or more nozzles which are configured for blowing gas against the screen, wherein the screen is placed obliquely or vertically, and in that the first chamber further comprises a float gas unit, wherein the float gas unit is configured for, in use, providing an upwards directed flow of float gas directly into a part of the first chamber, and wherein the screening device is configured for, in use, providing a pressure difference between the first chamber and the second chamber such that the pressure in the second chamber is lower than the pressure in the first chamber, and wherein the raw material inlet is arranged at a top side of the first chamber, and wherein the float gas unit is arranged at a bottom side of the first chamber and is configured to direct the float gas in the upwards direction such that the float gas provides a counter flow directly against a flow of raw material from the raw material inlet.

2. The screening device according to claim 1, wherein the second chamber or the product material outlet are configured for connecting a suction apparatus or vacuum pump for, in use, reducing the pressure in the second chamber.

3. The screening device according to claim 1, wherein the raw material inlet and the float gas unit are arranged at opposite sides of the first chamber.

4. The screening device according to claim 1, wherein the float gas unit comprises a fan or a float gas inlet.

5. The screening device according to claim 1, wherein the first chamber further comprises a drive gas inlet, wherein the drive gas inlet is arranged at or near a top side of the first chamber, or wherein the drive gas inlet is arranged in a side wall of the first chamber, or wherein the drive gas inlet is arranged substantially opposite to the partition wall or the screen.

6. The screening device according to claim 1, wherein the screening device is configured for introducing the raw material into the first chamber together with a transport gas.

7. The screening device according to claim 1, wherein the residual particle outlet is arranged at or near a bottom side of the first chamber.

8. The screening device according to claim 1, wherein the angle of the screen with respect to a horizontal plane is between the 45 and 90 degrees.

9. The screening device according to claim 1, wherein the screening device is configured to comprise a vertical axis in the first chamber, wherein the vertical axis crosses the screen at a position in a vertically lower part of the screen, and wherein the vertical axis is spaced apart from the screen at a position in a vertically upper part of the screen.

10. The screening device according to claim 1, wherein the product material outlet is arranged at or near a bottom side of the second chamber.

11. The screening device according to claim 1, wherein the screening device comprises an actuator which is configured to rotate the rotatable blade in front of the screen.

12. The screening device according to claim 1, wherein the float gas, the gas for the rotatable blade, the drive gas or the transport gas are inert gasses.

13. The screening device according to claim 1, further comprising a cyclone unit which is attached to the product material outlet, wherein the cyclone unit is configured for substantially separating screened particles from a gas stream.

14. The screening device according to claim 13, wherein the cyclone unit comprises:

a chamber for separating the screened particles and the gas stream, an inlet in fluid connection with the product material outlet, a gas outlet for the gas stream, and a cyclone material outlet.

15. The screening device according to claim 1, wherein the float gas unit provides the upwards directed flow of float gas as a jet of upwards directed float gas.

16. The screening device according to claim 1, wherein the upwards directed flow of float gas is configured to bring at least part of the raw material in a substantially floating condition adjacent to the screen.

17. An assembly for screening powder, wherein said assembly comprising a first screening device and a second screening device, wherein each of the first screening device and the second screening device comprises:

a screening space comprising a first chamber and a second chamber, wherein the first chamber and the second chambers are adjacent and have a common partition wall, and a screen, wherein the screen forms at least a part of the partition wall, wherein the first chamber comprises a raw material inlet and a residual particle outlet, wherein the second chamber comprises a product material outlet and a rotatable blade, wherein the rotatable blade comprises one or more nozzles which are configured for blowing gas against the screen, wherein the screen is placed obliquely or vertically, and in that the first chamber further comprises a float gas unit, wherein the float gas unit is configured for, in use, providing an upwards directed flow of float gas directly into a part of the first chamber, and wherein the screening device is configured for, in use, providing a pressure difference between the first chamber and the second chamber such that the pressure in the second chamber is lower than the pressure in the first chamber, wherein the raw material inlet is arranged at a top side of the first chamber, and wherein the float gas unit is arranged at a bottom side of the first chamber and is configured to direct the float gas in the upwards direction such that the float gas provides a counter flow directly against a flow of raw material from the raw material inlet, wherein the assembly further comprises a connection between the raw material inlet of the second screening device and the product material outlet of the first screening device.

18. The assembly according to claim 17, wherein the first chamber of the first screening device and first chamber of the second screening device both comprise a drive gas inlet.

19. The assembly according to claim 17, wherein the connection between the product material outlet of the first screening device and the raw material inlet of the second screening device comprises a buffer, wherein the buffer is configured for collecting the product material of the first screening device and for dosing and transferring said product material to the second screening device.

20. The assembly according to claim 19, further comprising a cyclone unit which is attached to the product material outlet, wherein the cyclone unit is configured for substantially separating screened particles from a gas stream, wherein the cyclone unit is arranged between the first screening device and the buffer.

21. The assembly according to claim 17, further comprises a suction apparatus or vacuum pump which is arranged in fluid connection to the second chamber of the second or the first screening device.

22. A method for screening powder using a screening device comprising:

a screening space comprising a first chamber and a second chamber, wherein the first chamber and the second chambers are adjacent and have a common partition wall, and a screen, wherein the screen forms at least a part of the partition wall, wherein the first chamber comprises a raw material inlet and a residual particle outlet, wherein the second chamber comprises a product material outlet and a rotatable blade, wherein the rotatable blade comprises one or more nozzles which are configured for blowing gas against the screen, wherein the screen is placed obliquely or vertically, and in that the first chamber further comprises a float gas unit, wherein the float gas unit is configured for, in use, providing an upwards directed flow of float gas directly into a part of the first chamber, and wherein the screening device is configured for, in use, providing a pressure difference between the first chamber and the second chamber such that the pressure in the second chamber is lower than the pressure in the first chamber, wherein the raw material inlet is arranged at a top side of the first chamber, and wherein the float gas unit is arranged at a bottom side of the first chamber and is configured to direct the float gas in the upwards direction such that the float gas provides a counter flow directly against a flow of raw material from the raw material inlet, wherein the method comprising the steps of:

providing powder in the first chamber via the raw material inlet, wherein the powder comprises an assembly of particles having a variety of dimensions;

activating the float gas unit in the first chamber to provide the counter flow configured for at least partially suspending or floating at least part of the particles of the powder in the first chamber;

blowing gas against the screen by means of one or more nozzles of the rotating blade;

providing the pressure difference between the first chamber and the second chamber such that the pressure in the second chamber is lower than the pressure in the first chamber; and allowing the particle of said powder with dimensions smaller than openings in the screen to pass through the screen into the second chamber, wherein the particles arriving in the second chamber are part of a product material which exits the second chamber via the product material outlet.

23. The method according to claim 22, wherein the first chamber of the screening device further comprises a drive gas inlet, wherein the drive gas inlet is arranged at or near a top side of the first chamber, or wherein the drive gas inlet is arranged in a side wall of the first chamber, or wherein the drive gas inlet is arranged substantially opposite to the partition wall or the screen, wherein the method further comprising the step of:

introducing a drive gas in the first chamber via the drive gas inlet to create or enhance a gas flow from the first chamber into the second chamber.

24. The method according to claim 22, wherein the screening device further comprising a cyclone unit which is attached to the product material outlet, wherein the cyclone unit is configured for substantially separating screened particles from a gas stream, wherein the method further comprising the step of:

separating the product material from the gas stream using a cyclone unit, wherein the product material leaves the cyclone unit substantially via the cyclone material outlet, while the gas stream leaves the cyclone unit via the gas outlet.

25. The method according to claim 22, wherein the powder provided in the first chamber includes metal particles.

26. A method for screening powder using an assembly comprising a first screening device and a second screening device, wherein each of the first screening device and the second screening device comprises:

a screening space comprising a first chamber and a second chamber, wherein the first chamber and the second chambers are adjacent and have a common partition wall, and a screen, wherein the screen forms at least a part of the partition wall, wherein the first chamber comprises a raw material inlet and a residual particle outlet, wherein the second chamber comprises a product material outlet and a rotatable blade, wherein the rotatable blade comprises one or more nozzles which are configured for blowing gas against the screen, wherein the screen is placed obliquely or vertically, and the first chamber further comprises a float gas unit, wherein the float gas unit is configured for, in use, providing an upwards directed flow of float gas directly into a part of the first chamber, and wherein the screening device is configured for, in use, providing a pressure difference between the first chamber and the second chamber such that the pressure in the second chamber is lower than the pressure in the first chamber, wherein the raw material inlet is arranged at a top side of the first chamber, and wherein the float gas unit is arranged at a bottom side of the first chamber and is configured to direct the float gas in the upwards direction such that the float gas provides a counter flow directly against a flow of raw material from the raw material inlet, wherein the assembly further comprises a connection between the raw material inlet of the second screening device and the product material outlet of the first screening device wherein the method comprising the steps of:

providing powder in the first chamber via the raw material inlet, wherein the powder comprises an assembly of particles having a variety of dimensions;

activating the float gas unit in the first chamber to provide the counter flow configured for at least partially suspending or floating at least part of the particles of the powder in the first chamber;

blowing gas against the screen by means of one or more nozzles of the rotating blade;

providing the pressure difference between the first chamber and the second chamber such that the pressure in the second chamber is lower than the pressure in the first chamber; and allowing the particle of said powder with dimensions smaller than openings in the screen to pass through the screen into the second chamber, wherein the particles arriving in the second chamber are part of a product material which exits the second chamber via the product material outlet, wherein the product material of the first screening device of the assembly is at least partially lead into the raw material inlet of the second screening device of the assembly.

27. The method for screening powder according to claim 26, wherein the product material of the first screening device is at least partially collected in a buffer, wherein the product material in the buffer is dosed and transferred to the raw material inlet of the second screening device.

* * * * *